US006167901B1

(12) United States Patent
Yoshinura

(10) Patent No.: US 6,167,901 B1
(45) Date of Patent: *Jan. 2, 2001

(54) PILOT 3-PORT TRANSFER VALVE

(75) Inventor: Shinichi Yoshinura, Yawara-mura (JP)

(73) Assignee: SMC Corporation, Tokyo (JP)

( * ) Notice: Under 35 U.S.C. 154(b), the term of this patent shall be extended for 0 days.

This patent is subject to a terminal disclaimer.

(21) Appl. No.: 08/946,853

(22) Filed: Oct. 8, 1997

(30) Foreign Application Priority Data

Oct. 28, 1996 (JP) .................................... 8-302557

(51) Int. Cl.[7] .................................. F15B 13/043
(52) U.S. Cl. .................... 137/269; 137/625.64; 137/854; 251/26
(58) Field of Search ................ 137/269, 625.64, 137/854; 251/26

(56) References Cited

U.S. PATENT DOCUMENTS 4,966,196 * 10/1990 Meyer .............................. 137/625.64
5,400,821 * 3/1995 Ott .................................. 137/854 X

FOREIGN PATENT DOCUMENTS 0 590 339 A1   4/1994 (EP) .
2 315 653      1/1977 (FR) .

OTHER PUBLICATIONS

Patent Abstracts of Japan: vol. 010, No. 218 (M–503), Jul. 30, 1986.

* cited by examiner

Primary Examiner—Gerald A. Michalsky
(74) Attorney, Agent, or Firm—Oblon, Spivak, McClelland, Maier & Neustadt, P.C.

(57) ABSTRACT

A transfer valve comprising three ports including a first, second, and third ports 17, 18, and 19 includes a pilot supply channel 22 for supplying a pilot fluid to a pilot valve 13, and the pilot supply channel 22 is connected to the first and the third ports 17 and 19 via check valves 41, 42, and 43, respectively.

4 Claims, 2 Drawing Sheets

PILOT 3-PORT TRANSFER VALVE

FIELD OF THE INVENTION

The present invention relates to a pilot 3-port transfer valve that switches a 3-port main valve using a pilot valve.

PRIOR ART

FIG. 3 shows a publicly known single pilot 3-port transfer valve wherein a transfer valve 1 comprises a 3-port main valve 2 and a solenoid-driven pilot valve 3. The main valve 2 includes a supply port P that is connected to a supply source of pressurized fluid such as compressed air; an output port A that is connected to an actuator; an ejection port R that is externally open; and a main valve member (not shown) that is operated by a pilot fluid pressure to connect the output port A to the supply port P or the ejection port R. In addition, the pilot valve 3 includes a pilot supply port (p); a pilot output port (a); a pilot ejection port (r); and a pilot valve member (not shown) that is driven by a solenoid 4 to connect the pilot output port (a) to the pilot supply port (p) or the pilot ejection port (r).

When the solenoid 4 of the pilot valve 3 is energized, the transfer valve 1 switches the pilot valve 3 to a position opposed to that shown in the figure to allow a pilot fluid to be output to the main valve 2 from the pilot output port (a), thereby switching the valve member of the main valve 2 to allow the supply port P to communicate with the output port A. As a result, a pressurized fluid is output from the output port A. When the solenoid 4 is de-energized, the pilot valve 3 returns to the switching position shown in the figure to externally eject the pilot fluid supplied to the main valve 2, from the pilot ejection port (r). Thus, the force of a return spring 5 causes the valve member of the main valve 2 to return to shut the output port A off from the supply port P while allowing the port A to communicate with the output port R. As a result, a pressurized fluid is output from the output port R.

The pilot 3-port transfer valve 1 is classified into an internal and external pilot types based on the method for supplying a pilot fluid to the pilot valve 3. In the internal pilot transfer valve, pilot fluid is supplied from the supply port P of the main body 2 through a channel provided in the valve body to the pilot supply port (p) of the pilot valve 3, whereas in the external pilot transfer valve, pilot fluid is supplied to the pilot supply port (p) through external piping connected to the pilot valve.

The pilot 3-port transfer valve 1 is also classified into a constantly closed type, such as that shown in the figure, in which the supply port P and the output port A are shut off during non-operating states in which a pilot fluid is not being supplied to the main valve 2; and a constantly open type in which the supply port P is in communication with the output port A.

The pilot 3-port transfer valve thus involves various types, and these different types of valves are used for different applications. Since, however, most of these valves are mutually incompatible, these various types have had to be individually provided and used, resulting in very cumbersome manufacturing and product control processes.

In particular, if the transfer valve is an external pilot transfer valve, a pilot fluid is supplied to the pilot valve 3 through external piping. Thus, the transfer valve can be changed between the constantly closed and the constantly open types by connecting either the port P or R of the main valve 2 to a supply source for pressurized fluid. In the internal pilot transfer valve, even when the port R is connected to such a supply source, the transfer valve cannot be changed between the constantly closed and constantly open types because a pilot fluid is not supplied to the pilot valve from the port R.

DISCLOSURE OF THE INVENTION

It is a main object of this invention to provide a pilot 3-port transfer valve that can be changed between a constantly closed type and a constantly open type even if it is of an internal pilot type.

It is another object of this invention to provide a pilot 3-port transfer valve that can be used as either an internal pilot or external pilot type.

To achieve these objects, this invention provides a pilot transfer valve comprising a first, second, and third ports for supplying, outputting, and ejecting a pressurized fluid characterized in that a pilot valve includes a pilot supply channel for supplying a pilot fluid to the pilot valve and in that the pilot supply channel and each of the first and the third ports are connected together via a check valve that allows a pressurized fluid to flow into the pilot supply channel from each port while checking the flow of pressurized fluid in the opposite direction.

Due to its ability to supply a pilot fluid from either of the first and the third ports through the check valve to the pilot valve, the transfer valve of the above configuration can be operated by connecting any of the ports to a supply source for a pressurized fluid. The transfer valve operates as the constantly closed type if the first port, which is shut off during an idle state, is connected to the supply source for pressurized fluid, and operates as the constantly open type if the third port, which communicates with the second port during an idle state, is connected to the supply source.

According to a specific embodiment, each check valve comprises a cylindrical valve body inserted into a circular valve chamber with a gap maintained for fluid communication; and an annular lip seal fitted around the outer circumference of the valve body to seal between the valve body and the inner wall of the valve chamber.

According to another specific embodiment, part of the pilot supply channel is defined and formed between the valve body of the transfer valve and a cover mounted on the valve body, the check valves corresponding to the first and the third ports are installed in the part beneath the cover, and the cover includes a protrusion that contacts the check valve to prevent it from slipping out from the valve chamber.

According to a preferred embodiment of this invention, the transfer valve includes an external pilot port for externally introducing a pilot fluid; a check valve that allows pressurized fluid to flow into the pilot fluid channel from the pilot port while checking the flow of pressurized fluid in the opposite direction is installed between the external pilot port and the pilot supply channel.

This configurations enables the transfer valve to be used as the external pilot type. If external piping is connected to the external pilot port and a pilot fluid with a higher pressure than a main fluid is supplied, the transfer valve is used as the external pilot type because the pilot fluid pushes the check valve open and is supplied to the pilot valve. In this case, the check valves corresponding to the first and the third ports prevent the highly pressurized pilot fluid from flowing back to these ports.

BRIEF DESCRIPTION OF THE INVENTION

DETAILED DESCRIPTION OF THE PREFERRED EMBODIMENTS

Figure 1:
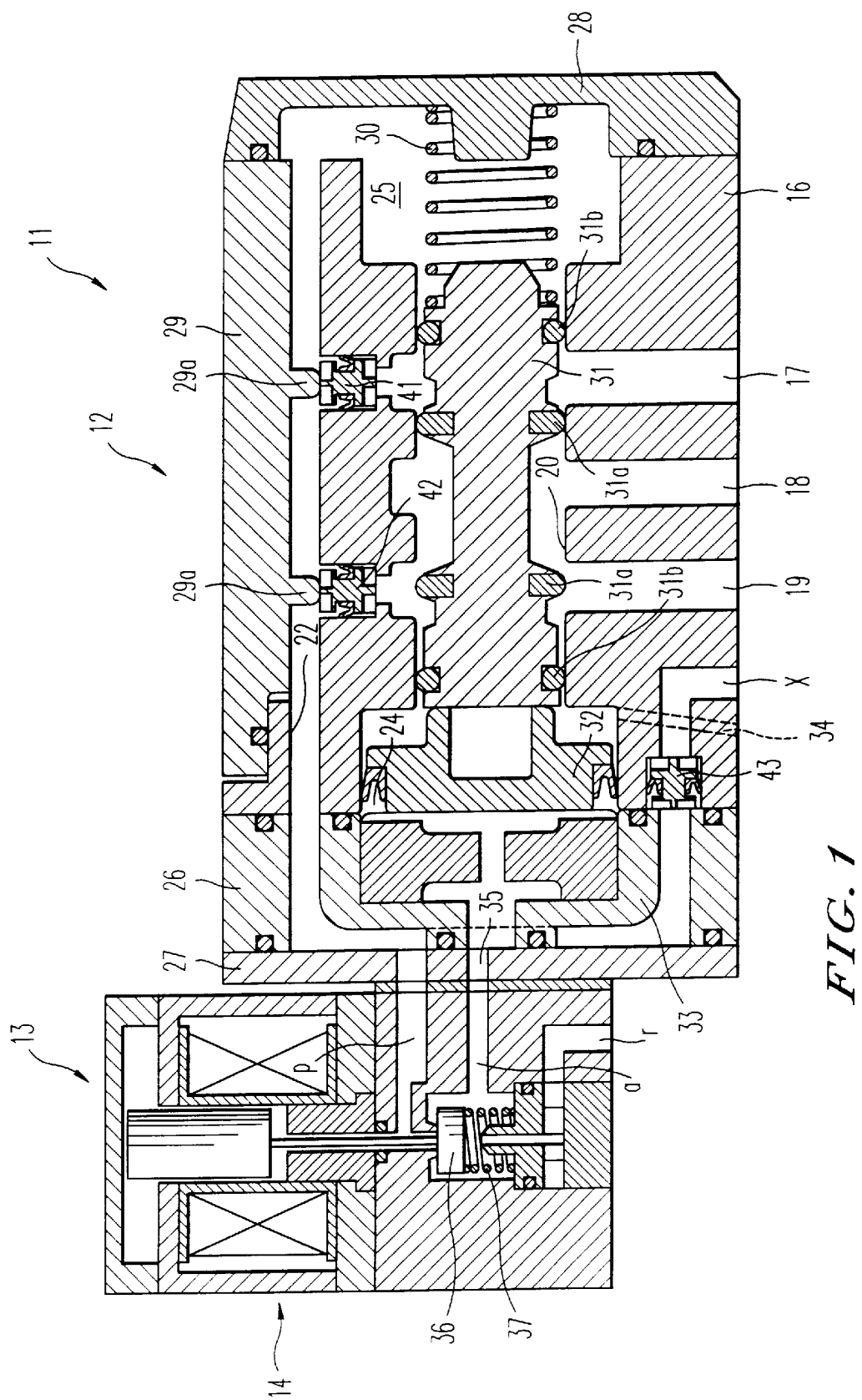
FIG. 1 is a cross sectional view showing one embodiment of a 3-port transfer valve according to this invention.
Figure 2:
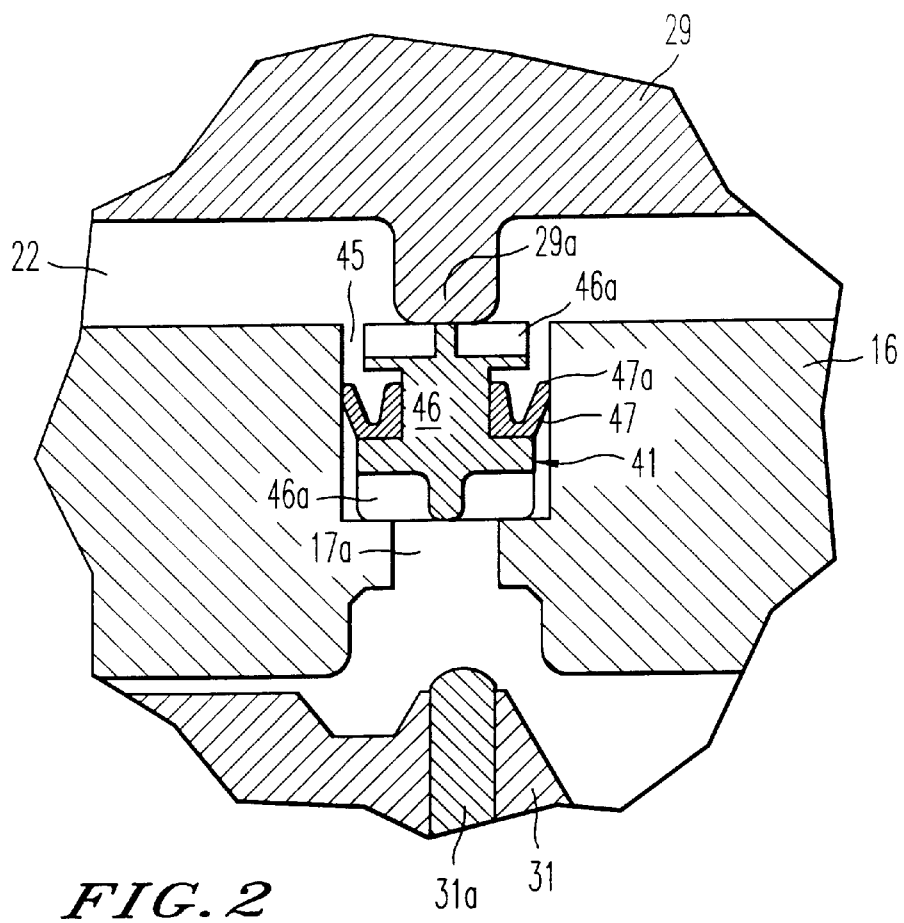
FIG. 2 is an enlarged view of the integral part of FIG. 1.
Figure 3:
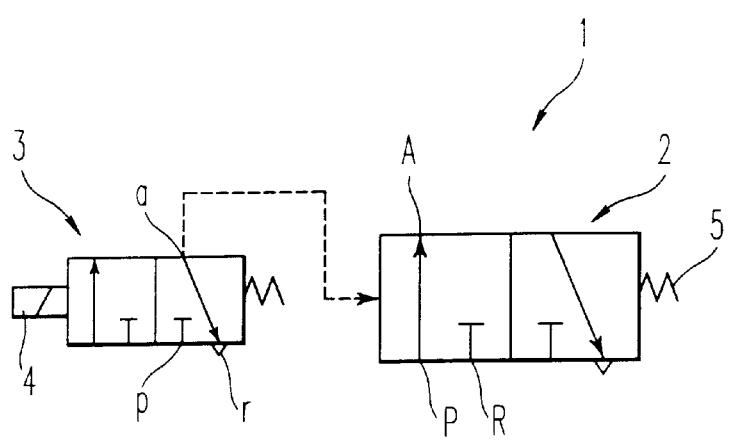
FIG. 3 shows the configuration of a publicly known 3-port transfer valve using symbols.

FIGS. 1 and 2 show a single pilot 3-port transfer valve 11 comprising a main valve 12 and a solenoid-driven pilot valve 13 and configured to be installed on a manifold base (not shown).

A valve body 16 of a main valve 12 is rectangular-parallellopiped-shaped and has a first port 17, a second port 18, a third port 19, and an external pilot port X sequentially disposed in its bottom surface in the longitudinal direction at an equal interval. A valve hole 20 with which the first, second, and third ports 17, 18, and 19 communicate is disposed inside the valve body 16, and a valve member 31 that alternatively allows the second port 18 at the center to communicate with the first and third ports 17 and 19 on either side of the second port is slidably disposed in the valve hole 20.

Seal rings 31a and 31a that open and close the channel between the first port 17 and the second port 18 and between the second port 18 and the third port 19 and O rings 31b and 31b that seal between the first port 17 and a return chamber 25 and between the third port 19 and a piston chamber 24 are fitted into grooves in the outer circumferential surface of the valve member 31.

The piston chamber 24 is formed under a relay box 26 at one end of the valve hole 20. A piston 32 with a larger diameter than the valve member 31 is slidably inserted into the piston chamber 24, and a cushion 33 that absorbs an impact occurring when the piston 32 moves to the left terminal is disposed inside the relay box 26.

The return chamber 25 is formed inside a presser cover 28 at the other end of the valve hole 20, and a return spring 30 with a small pressing force is contracted between the presser cover 28 and the valve member 31.

The main valve 12 has a pilot supply channel 22 that communicates with the first and the third ports 17 and 19 and the external pilot port X via a first, a second, and a third check valves 41, 42, and 43 and that also communicates with the return chamber 25 and a pilot supply port (p) of the pilot valve 13.

In the figure, 27 is a cover that covers the end surface of the relay box 26 and that defines part of the pilot supply channel 22 inside the relay box 26, and 29 is a cover that is mounted on the top surface of the valve body 16 to define part of the pilot supply channel 22 inside the valve body 16.

In addition, the piston chamber 24 is in communication with a pilot output port (a) of the pilot valve 13 through a pilot supply channel 35 formed in the relay box 26 and the cover 27. In the figure, 34 is a breather hole that externally opens the chamber between the rear surface of the piston 32 and the valve member 31.

The first and the second check valves 41 and 42 each allow a pressurized fluid to flow from the first and the third ports 17 and 19 to the pilot supply channel 22 while checking the flow in the opposite direction. The third check valve 43 allows pressurized fluid to flow from the pilot port X to the pilot supply channel 22 while checking the flow in the opposite direction. These check valves have the same configuration, and their specific configuration is shown in FIG. 2.

FIG. 2 shows the first check valve 41. The check valve 41 comprises a cylindrical valve body 46 inserted into a circular valve chamber 45 between a throughhole 17a leading to the first port 17 and the pilot supply channel 22; and an annular lip seal 47 with a V-shaped cross section that is fitted into a groove in the outer circumference of the valve body. The lip seal 47 uses a flexible lip 47a that contacts the inner wall of the valve chamber 45 in order to allow pilot fluid to flow from the first port 17 to the pilot supply channel 22 while checking the flow of pilot fluid from the pilot supply channel 22 to the first port 17. In the figure, 46a is a channel groove radially formed in both end surfaces of the valve body 46.

In addition, the upper end of the valve body 46 of the first check valve 41 is pressed by a protrusion 29a integrally formed on the cover 29 in order to prevent the valve body from slipping out from the valve chamber 45 due to the active force of air pressure. The second check valve 42 similarly has its valve body 46 pressed by the protrusion 29a of the cover 29, but the third check valve 43 is prevented from slipping out from the valve chamber 45 by the valve body 46 contacting the relay box 26. Of course, the protrusion 29a must be sized to prevent the flow of a pilot fluid through the pilot supply channel 22 from being interrupted.

The pilot valve 13 is configured as a well-known constantly-closed 3-port solenoid valve and includes the pilot supply port (p), the pilot output port (a), the pilot ejection port (r), a pilot valve member 36 that allows the pilot output port (a) to communicate with the pilot supply or ejection port (p) or (r), and a return spring 37 that pushes the pilot valve member 36 in the direction in which the pilot supply port (p) is closed. When the solenoid 14 is energized, the pilot valve member 36 allows the pilot supply port (p) to communicate with the pilot output port (a), whereas when the solenoid 14 is de-energized, the force of the return spring 37 causes the pilot valve member 36 to return to the state shown in the figure, thereby allowing the pilot output port (a) to communicate with the pilot ejection port (r).

The transfer valve 11 of this configuration acts as the internal pilot type if a pilot fluid is not supplied from the external pilot port X to the pilot valve 13 and otherwise, acts as the external pilot type.

The transfer valve 11 also operates as the constantly closed type if the first port 17 of the main valve 12 is connected to a supply source for pressurized fluid or as the constantly open type if the third port 19 is connected to the supply source.

In a first use example, if the transfer valve 11 is allowed to operate as the internal pilot type, with external piping for supplying a pilot fluid remaining disconnected from the external pilot port X, and the first port 17 is connected to the supply source for pressurized fluid, the transfer valve 11 can be used as the internal pilot and constantly closed type. In this case, a pilot fluid is supplied from the first port 17 through the first check valve 41 and the pilot supply channel 22 to the return chamber 25 and the pilot supply port (p) of the pilot valve 13. The pilot fluid, however, is prevented from flowing back to the third or the external pilot port 19 or X due to the operation of the second and the third check valves 42 and 43.

In this internal pilot and constantly closed type transfer valve, while the solenoid 14 is de-energized as shown in the figure, the active force of pilot fluid supplied to the return chamber 25 and the force of the return spring 30 cause the valve member 31 to be placed in its first switching position. At this point, the first port 17 (the supply port) is shut off from the second port 18 (the output port), while the second port 18 (the output port) and the third port 19 (the ejection port) are in communication with each other.

When the solenoid 14 is energized, a pilot fluid is supplied from the pilot supply port (p) through the pilot output port (a) and the pilot output channel 35 to the piston chamber 24 of the main valve 12, thereby causing the piston 32 to move the valve member 31 to the right as seen in the figure. The transfer valve then assumes a second switching position in which the first port 17 is allowed to communicate with the second port 18, while the third port 19 is shut off from the second port 18, with pressurized fluid out put from the second port 18.

When the solenoid 14 is then de-energized, the pilot fluid in the piston chamber 24 is ejected from the pilot ejection port (r) through the pilot output channel 35, so the actions of both the pilot fluid being supplied to the return chamber 25 and the return spring 30 cause the valve member 31 to be pressed to return to its first switching position, as shown in the figure, together with the piston 32. The first port 17 is then shut off, while the second and the third ports 18 and 19 are allowed to communicate with each other, with pressurized fluid ejected from the third port 19.

In a second use example, if the transfer valve 11 is allowed to act as the internal pilot type and the third port 19 is connected to a supply source for pressurized fluid as a supply port, the transfer valve 11 can be used as an internal pilot and constantly open type. In this case, a pilot fluid from the third port 19 pushes the second check valve 42 open and then enters the pilot supply channel 22. While the solenoid is de-energized, the third port 19 (the supply port) and the second port 18 (the output port) are in communication with each other, with a pressurized fluid output from the second port 18 and the first port 17 (ejection port) shut off. When the solenoid 14 is energized, the third port 19 is shut off and the second port 18 is allowed to communicate with the first port 17, with pressurized fluid from the second port 18 ejected from the first port 17.

In a third use example, if external piping for supplying a pilot fluid is connected to the external pilot port X and the first port 17 is connected to a supply source for pressurized fluid in order to supply a pilot fluid under a pressure higher than that of a main fluid supplied to the first port 17, from the external piping to the external pilot port X, the transfer valve 11 can be used as an external pilot and constantly closed type. In this case, the pilot fluid from the external pilot port X is supplied to the return chamber 25 and the pilot supply port (p) through the check valve 43 and the pilot supply channel 22, but the first and the second check valves 41 and 42 prevent it from flowing back to the first or third port 17 or 19.

The external pilot and constantly closed type transfer valve in the third use example has substantially the same operation as the internal pilot and constantly closed transfer valve in the first use example, except for the supply path of the pilot fluid, so a description of its operation is omitted.

In a fourth use example, if the transfer valve 11 is allowed to operate as the external pilot type and the third port 19 is connected to a supply source for pressurized fluid, the transfer valve 11 can be used as an external pilot and constantly open type. This external pilot and constantly open transfer valve has substantially the same operation as the internal pilot and constantly open transfer valve according to the second embodiment, except for the supply path of the pilot fluid, so a description of its operation is omitted.

Even if the supply of a pilot fluid to the external pilot port X is stopped, or the pressure of the pilot fluid decreases below that of the main fluid while the transfer valve 11 is being used as the external pilot type as in the third and the fourth use, the transfer valve 11 automatically switches to the internal pilot type due to the operation of check valves 41, 42, or 43. It switches back to the external pilot type when the supply of pilot fluid is resumed or the pressure increases.

Thus, the pilot 3-port transfer valve can be switched between the external pilot type and the internal pilot type by simply determining whether or not pilot fluid is supplied through the external pilot port. Whether the external or the internal pilot type is selected, either a constantly closed or constantly open type can be chosen by connecting either the first or the third port to a supply source for pressurized fluid.

As a result, the single transfer valve can be used as a plurality of types. Thus, if for example, different types of transfer valves such as the contantly closed and constantly open types are to be used and collectively controlled, the same type of transfer valve can be used for this purpose by being collectively mounted on a common manifold. Such a configuration is very convenient and prevents errors and malfunctions, resulting in improved reliability.

The pilot valve 13 is not limited to the solenoid-driven type shown in the figure but may use another well-known driving force other than a solenoid.

Although in the illustrated embodiment, each check valve is formed using a directional lip seal 47, these valves may be of a poppet type. The poppet check valve opens and closes from the pilot supply channel 22 side, with a valve seat formed between the pilot supply channel 22 and each port.

Furthermore, although both the pilot fluid supplied to the return chamber 25 and the return spring 30 are used as the means for returning the valve member 31, only one of them may be used.

What is claimed is:

1. A pilot 3-port transfer valve comprising:

three ports including a first, second, and third ports provided to supply, eject, and output a pressurized fluid;

a valve member movably installed in a valve hole with which said first, second, and third ports communicate for switching the connection among the ports;

a returning means operative while the transfer valve is not operating, for maintaining said valve member in a first switching position in which said second and third ports communicate with each other and in which the first port is shut off from the other ports;

a pilot valve operative while the transfer valve is operating, for moving said valve member to a second switching position in which said first and second ports communicate with each other and in which the third port is shut off from the other ports;

a pilot supply channel connected to said pilot valve for supplying a pilot fluid to said pilot valve;

check valves installed between said pilot supply channel and each of said first and third ports for allowing pressurized fluid to flow from each port to the pilot supply channel while checking its flow in the opposite direction; and an external pilot port allowing the pilot fluid to be externally introduced;

wherein at least one check valve is installed between the external pilot port and said pilot supply channel to allow pilot fluid to flow from the pilot port to the pilot supply channel while checking its flow in the opposite direction.

2. A transfer valve according to claim 1 wherein each of said check valves comprises a valve body inserted into a valve chamber formed between each of said ports and said pilot supply channel with a gap maintained for fluid communication; and an annular lip seal fitted on the outer circumference of the valve body to seal between the valve body and the inner wall of the valve chamber.

3. A transfer valve according to claim 2 wherein part of said pilot supply channel is defined and formed between the body of the transfer valve and a cover mounted on the valve body, wherein said check valve is installed in the part beneath the cover, and wherein the cover includes a protrusion that contact the check valve to prevent it from slipping out from the valve chamber.

4. A transfer valve according to claim 1 wherein the check valve installed between said external pilot port and said pilot supply channel comprises a valve body inserted into a valve chamber formed between said external pilot port and said pilot supply channel, with a gap maintained for fluid communication; and an annular lip seal fitted on the outer circumference of the valve body to seal between the valve body and the inner wall of the valve chamber.

* * * * *

UNITED STATES PATENT AND TRADEMARK OFFICE
CERTIFICATE OF CORRECTION

PATENT NO. : 6,167,901 B1  
DATED : January 2, 2001  
INVENTOR(S) : Shinichi Yoshimura It is certified that error appears in the above-identified patent and that said Letters Patent is hereby corrected as shown below:

<u>Title page,</u>
Item [12] and Item [75], the Inventor's last name is incorrect. The CPA information is also omitted. They should read as follows:

[12] Yoshimura

[75] Inventor: Shinichi Yoshimura, Yawara-mura (JP)

[*] Notice: This patent issued on a continued prosecution application filed under 37 CFR 1.53(d), and is subject to the twenty year patent term provisions of 35 U.S.C. 154 (a)(2). --

Signed and Sealed this

Thirtieth-Day of October, 2001

*Attest:*

*Attesting Officer*

NICHOLAS P. GODICI  
*Acting Director of the United States Patent and Trademark Office*